UNITED STATES PATENT OFFICE.

JOSÉ MANUEL CACHO NEGRETE, OF HABANA, CUBA.

FOOD PRODUCT.

1,243,964. Specification of Letters Patent. Patented Oct. 23, 1917.

No Drawing. Application filed July 17, 1917. Serial No. 181,139.

*To all whom it may concern:*

Be it known that I, JOSÉ MANUEL CACHO NEGRETE, a citizen of the Republic of Cuba, and a resident of Habana, Cuba, have invented certain new and useful Improvements in Food Products, of which the following is a complete specification.

This invention relates to a new food product, whose ingredients are well known. The same is composed of the pulp of the banana fruit which fruit is preferably picked while green to which is mixed the usual bee honey to which may be added a slight quantity of sugar, according to taste.

I carry out my invention as follows: After shelling and cutting off the heart of the banana fruit, the pulp is well pounded in a mortar or similar receptacle, into which is poured honey in the proportions of approximately two parts of banana pulp and one part honey. To the latter may be added a quantity of cane sugar, preferably of the white variety. The pulp and honey are mixed together until they form a mixture of uniform density which is thereupon slightly cooked and pasteurized by applying the temperature of approximately 160° Fahrenheit. After the foregoing has been done the product is ready for packing, the mass thus obtained having a brilliant caramel color and an appearance similar to butter milk.

What I claim is:

1. A food product consisting of the pulp of the banana fruit and bee honey.

2. A food product consisting of the pulp of the banana fruit and bee honey, in the proportions of two parts of pulp and one part of honey.

3. A food product consisting of the pulp of not quite ripe banana fruit and bee honey.

4. A food product consisting of the pulp of banana fruit and bee honey, the latter having added to it a certain amount of sugar.

In testimony whereof I affix my signature in presence of two witnesses.

JOSÉ M. CACHO NEGRETE.

Witnesses:
CARLOS NOGUERAL,
H. C. VOGENITZ.